(12) United States Patent
Funt et al.

(10) Patent No.: US 7,264,024 B2
(45) Date of Patent: Sep. 4, 2007

(54) VALVE FOR CLOSING A CONTAINER, CONTAINER AND A SYSTEM AND METHOD FOR FILLING CONTAINER

(75) Inventors: Mark Funt, Kfar Saba (IL); Michel Ben-Simon, Beer Sheva (IL); Gregory Leved, Rehevot (IL); Avi Cohen, Jerusalem (IL)

(73) Assignee: Soda Club (CO2) Atlantic GmbH, Zug (CH)

(*) Notice: Subject to any disclaimer, the term of this patent is extended or adjusted under 35 U.S.C. 154(b) by 200 days.

(21) Appl. No.: 10/519,453

(22) PCT Filed: Jun. 20, 2003

(86) PCT No.: PCT/EP03/06526

§ 371 (c)(1),
(2), (4) Date: Dec. 29, 2004

(87) PCT Pub. No.: WO2004/010046

PCT Pub. Date: Jan. 29, 2004

(65) Prior Publication Data

US 2005/0150566 A1     Jul. 14, 2005

(30) Foreign Application Priority Data

Jul. 18, 2002     (EP)     .................. 02015978

(51) Int. Cl.
*B65B 1/04*     (2006.01)
(52) U.S. Cl. .................... 141/2; 141/18; 141/301; 141/302; 137/199
(58) Field of Classification Search .............. 141/2, 141/18, 286, 301, 302, 83; 137/199, 469–471, 137/535, 538, 540, 542, 543.17
See application file for complete search history.

(56) References Cited

U.S. PATENT DOCUMENTS

| | | | |
|---|---|---|---|
| 2,977,978 A * | 4/1961 | Miller et al. | 137/470 |
| 4,056,133 A * | 11/1977 | Deters | 141/301 |
| 4,537,384 A * | 8/1985 | Petersen et al. | 137/542 |
| 5,215,114 A * | 6/1993 | Breyer | 137/469 |
| 5,551,490 A | 9/1996 | Kountz et al. | |
| 5,570,229 A | 10/1996 | Kanamori | |

(Continued)

FOREIGN PATENT DOCUMENTS

DE     8402594     6/1984

(Continued)

*Primary Examiner*—Steven O. Douglas
(74) *Attorney, Agent, or Firm*—Shoemaker and Mattare

(57) ABSTRACT

A valve for closing a container and for enabling the container to be filled has a housing (20) with an inlet port (30) and an outlet port (40). A closing member (60) is provided for sealingly closing the valve at the inlet port (30). At least one valve member (70) is provided for controlling fluid communication between the inlet port (30) and the outlet port (40). The valve member only allows fluid communication when it is in a first position. The valve member (70) is designed in such a way that it is brought into and maintained in said first position only if a predetermined filling condition is achieved. The filling condition is typically achieved, when the filling pressure of a system for filling the container (50) is initially below a first predetermined or predeterminable threshold value.

23 Claims, 8 Drawing Sheets

Figure 1A:
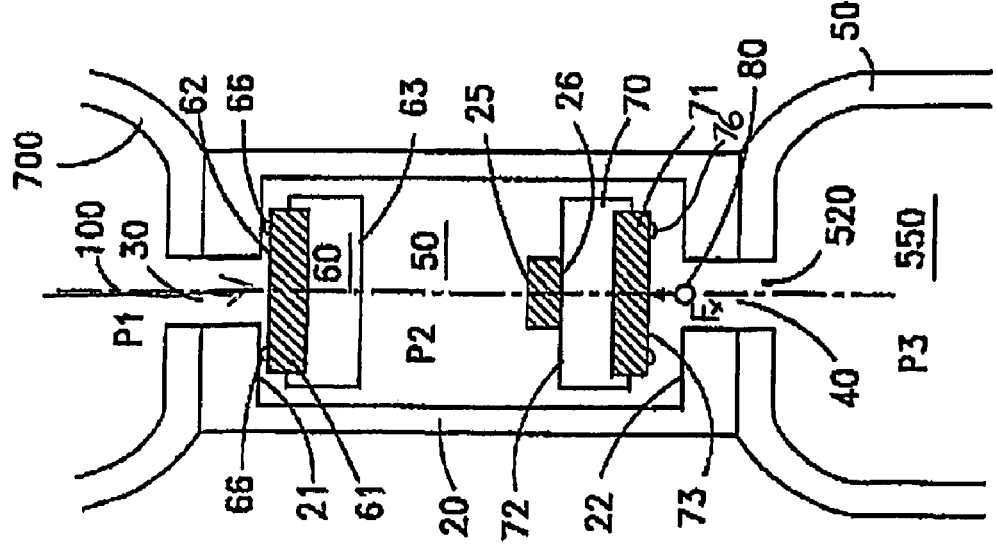

U.S. PATENT DOCUMENTS 5,653,269 A    8/1997  Miller et al.
6,354,473 B1   3/2002  Brambach et al.
6,968,858 B2 * 11/2005 Kuehn et al. ............ 137/539.5

FOREIGN PATENT DOCUMENTS

| | | |
|---|---|---|
| EP | 0161348 | 11/1985 |
| EP | 0233775 | 8/1987 |
| EP | 1154179 | 11/2001 |
| FR | 1116274 | 5/1956 |

* cited by examiner

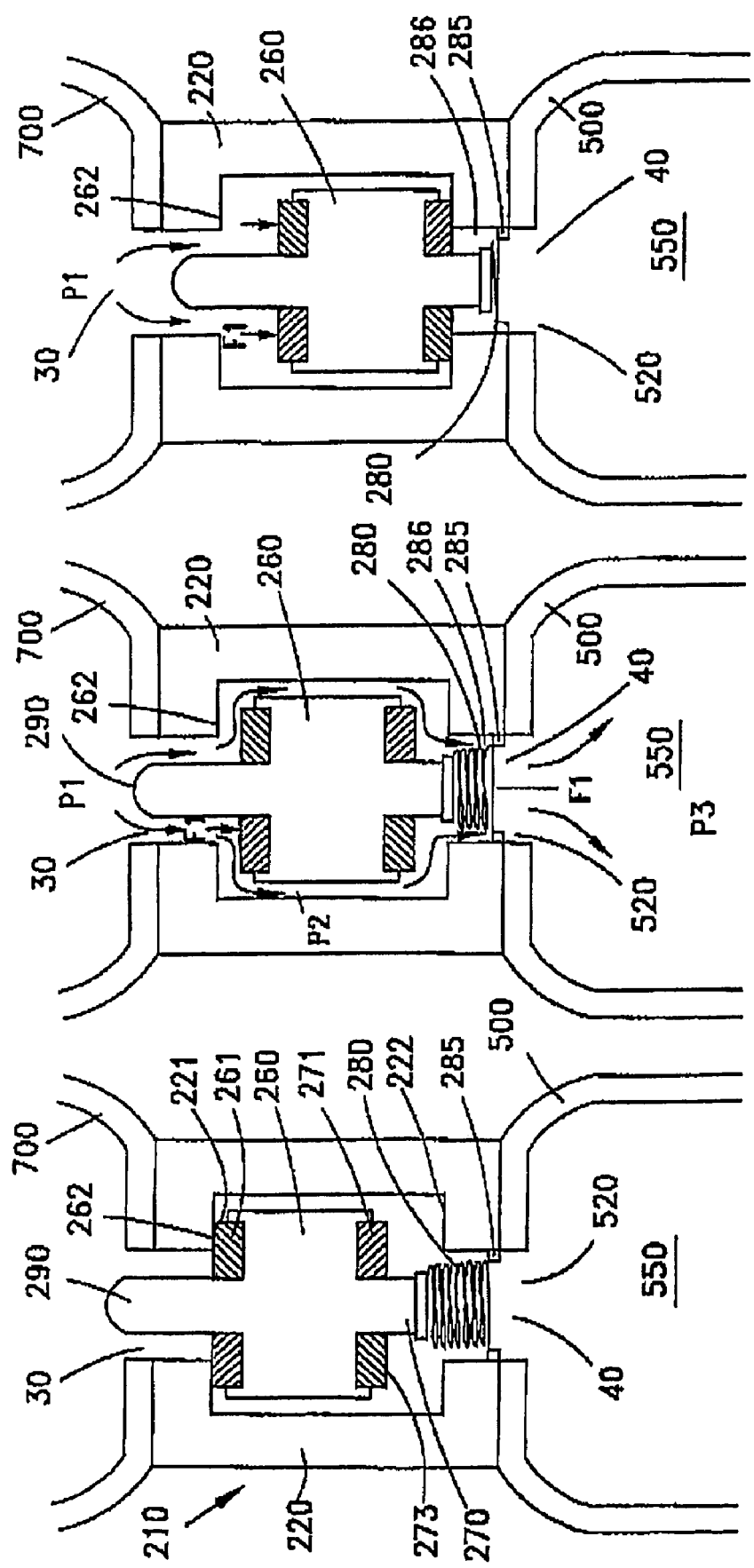

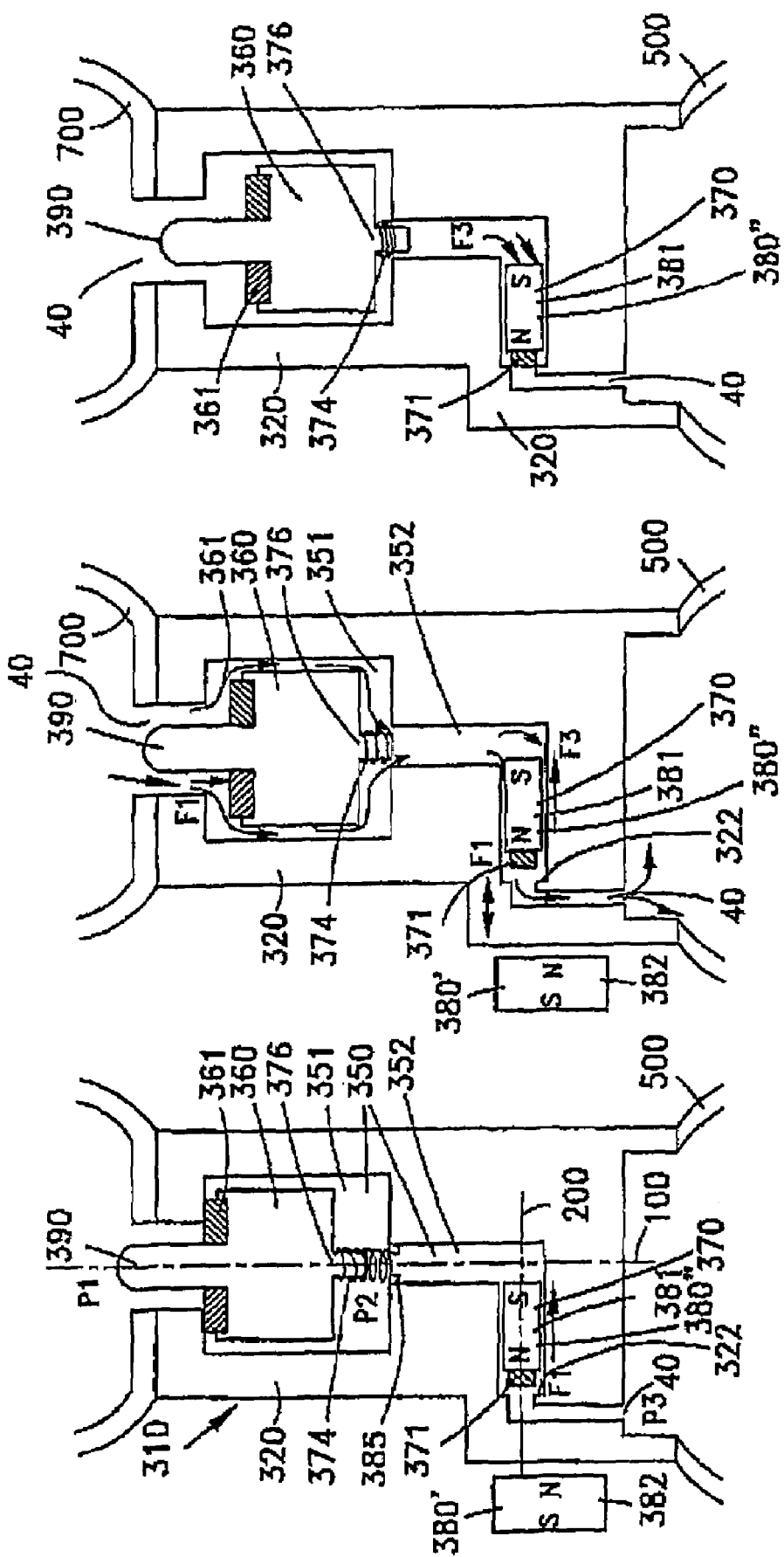

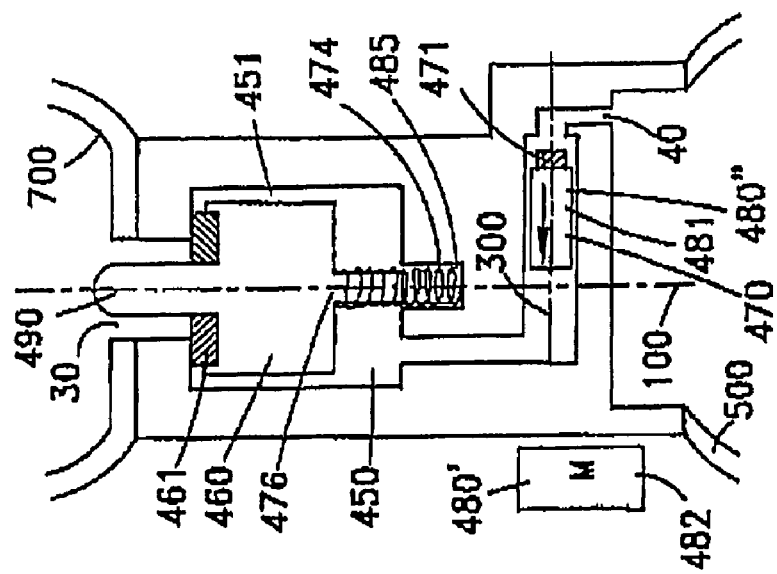
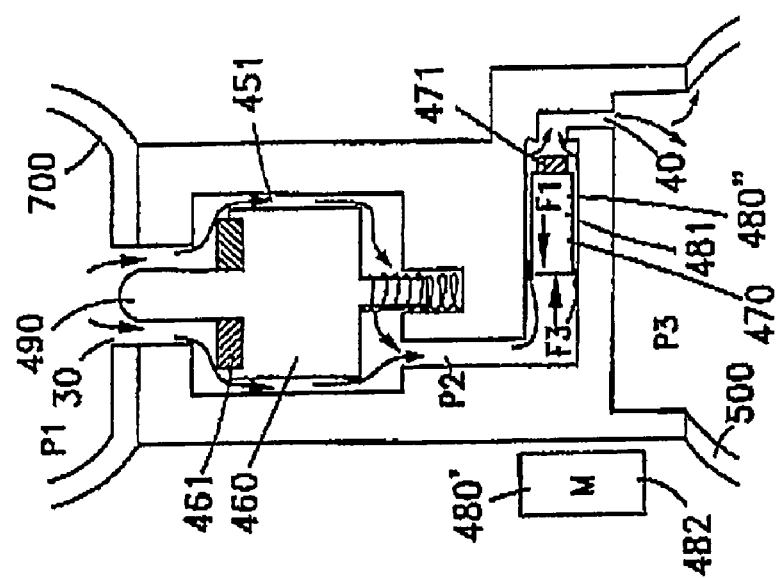
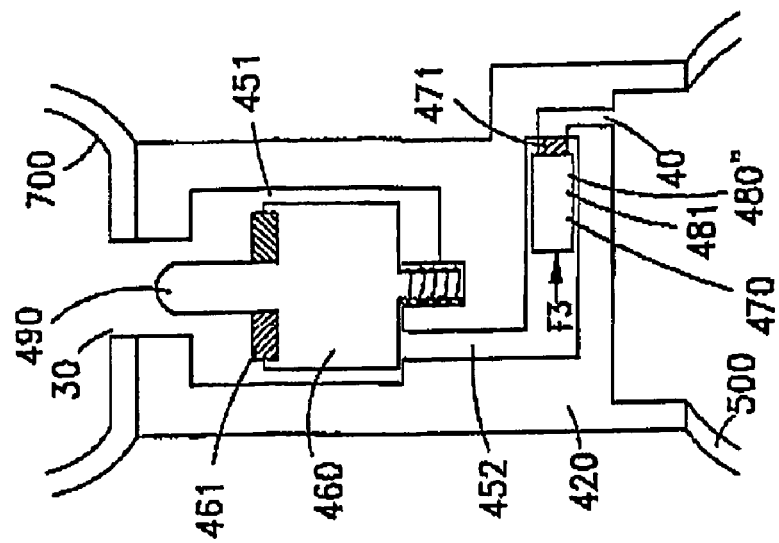
Fig. 4(a)
Fig. 4(b)
Fig. 4(c)

VALVE FOR CLOSING A CONTAINER, CONTAINER AND A SYSTEM AND METHOD FOR FILLING CONTAINER

The invention relates to a valve for closing a container, to a system and a method for filling such a container with a fluid, and to a container. Containers such as cylinders containing a pressurised gas or a liquid or other receptacles are commonly used for storing and dispensing gases or fluids for both home and industrial uses. Often, there is a need to provide refilling systems for such containers. Particularly When such containers represent a substantial capital value, there is a need for refillable and returnable containers. There have been proposed many examples of such containers that can be refilled with new content of gas or liquid after they have been emptied or have been partially used. Such containers can usually be easily refilled by providing a gas or liquid at pressure into a filling and dispensing opening of the container. Typically, e.g. in the case of cylinders containing fluids under pressure, such containers have a dispensing valve which is usually closed. This valve prevents leakage or the evaporisation of the fluid contents, that may be under pressure and/or volatile. Such valves are designed to be selectively opened by a user. The valve is typically opened by depressing a pin to enable the contents of the container to be dispensed or also to enable the container to be filled with a fluid.

One problem that may arise in the refilling of such containers is that of ensuring that the containers are only filled with the correct fluid and that the fluid is provided only from authorised sources. Current filling systems can be duplicated relatively easily thereby enabling the refilling of a container by another fluid and/or by non-authorised sources.

A typical example are $CO_2$ cylinders which are specially designed to fit into machines requiring gas pressure, e.g. for soda-making machines. Such machines for home use can generally be filled from any suitable $CO_2$ source. Thus, the provider of the original containers cannot ensure that the users will only go to that provider when the user desires to refill the container. Similarly a fuel or gas container adapted to serve a home or a number of apartments in a building may often be refilled by any suitable fuel or gas source, without reference to the original provider of the container. Similarly, a gasoline or fuel station has containers that can generally be refilled with any desired fluid and not just the specific fuel designated for the containers and without reference to the original provider of fuel or gasoline.

There have been some proposals for valves allowing selective filling of a container.

U.S. Pat. No. 5,487,404 relates to a tap that stops a filling operation automatically by means of a two-way valve. This tap is not directed to the prevention of unauthorised filling of containers.

U.S. Pat. No. 4,195,673 is directed to increasing the difficulty accompanying the dispensing of leaded fuel into a vehicle tank that requires unleaded fuel in systems where the nozzles used for dispensing leaded fuel is regulated to be smaller than the nozzles used for dispensing unleaded fuel. A magnetic collar is provided to the unleaded fuel nozzle, which interacts with a valve in a tank enabling the valve to open only when a dispensing nozzle carrying a magnet is inserted into the fill tube. However, such arrangement only has one single sealing element. Such an arrangement is especially difficult to be used in context with fluid sources where the fluid is pressurised. A similar magnetic seal arrangement is further shown in U.S. Pat. No. 5,474,115.

In U.S. Pat. No. 3,674,061, a nozzle arrangement in combination with a vent are provided in such a manner that when the level in the tank being filled with a volatile liquid reaches a predetermined point, the pressure of gas in the tank suddenly increases to equalize with the delivery pressure of the liquid. Sensing means sense the abrupt rise in pressure and a shut-off valve responsive to the sensing means cuts the flow through the delivery nozzle.

Prior art systems have several drawbacks: Especially, prior art systems such as systems for filling $CO_2$ bottles do not allow to ensure that the container is only refilled by the original provider or via other authorised agents. This inability of the prior art may lead to a lowering of the quality of the refill substances. The original provider therefore might be unjustly-associated with lower quality fluid because of the association of the original bottle with low quality fluid. In addition, the lack of control over refilling operations may also constitute a source of danger and may lead to accidents and/or injuries, which could be prevented by appropriate filling of the container. The lack of control over refilling operations may also constitute a loss in potential income by the original provider.

WO 00/77442 relates to a refillable $CO_2$ gas cylinder and to a filling device and a filling method. This document addresses a way to better protect a cylinder against being refilled by an unauthorised person. For this purpose, the document suggests a valve body, which forms a piston cylinder unit together with an axially displaceable locking member. The piston cylinder can be impinged upon with a gas via an overflow channel. The locking member can be axially extended towards the interior where it buts against a stop in the valve. Refilling without an appropriate filling system shall be prevented. This solution, however, has certain drawbacks. Mechanical means are provided in the filling device. These mechanical means must be used to hold open the locking member. It is, however, rather easy to overcome the function of the locking member by providing suitable mechanical opening means.

It is therefore an object of the present invention to overcome the drawbacks of the prior art, especially by providing a valve, a container, a system, and a method for filling such a container allowing the original provider to ensure that refilling of the container is only conducted via themselves or other authorised agents. The systems should be especially suitable for containers including pressurised gases in gas or partially liquid form.

The valve and the container as well as the system should be easy to manufacture. According to a further object of the invention, the use of a system and a valve according to the invention should not make the filling or refilling of a container by an authorised user more difficult or more time consuming.

According to the present invention, these and other objects are solved with a valve, a container, a system, and a method for filling such a container according to the independent patent claims.

A valve for closing a container and for enabling the container to be filled comprises a housing. The housing is provided with an inlet port and with an outlet port. The inlet port is adapted to be connected to an appropriate fluid source. The outlet port is adapted to be connected to the container. The connection between the inlet port and the fluid source or the connection between the outlet port and the container can be both, direct or indirect. Appropriate tubing could be provided for making an indirect connection. The inlet port is connected to a fluid source for filling or refilling the container with a content. The terms filling and refilling are used interchangeably in the context of this application. The inlet port can also be connected to an appropriate machine for dispensing the content, e.g. to a soda machine.

The valve comprises a closing member for sealingly closing the valve. The closing member is used to keep the content within the container unless dispensing of the content is desired by a user. The valve further has at least one valve member. In a first position, the valve member allows fluid communication from the inlet port to the outlet port. When the valve member is in the first position, a container provided with such a valve can be refilled with a fluid. Fluid, as used in the context of this application, includes gas, liquids or mixtures thereof. When the valve member is in a second position, fluid communication from the inlet port to the outlet port is prevented. The valve member is designed in such a way that it is brought into and/or maintained in said first position only if a predetermined filling condition is fulfilled. The valve according to the invention on the one hand is used as a conventional valve for sealingly closing a container. On the other hand, the valve is used for preventing refilling of containers by unauthorised persons. Unauthorised persons who do not know that a specific filling condition must be fulfilled in order to open a passage between the inlet port and the outlet port are unable to refill a container provided with such a valve.

According to the invention, the valve member is brought into and maintained in said first position only if the static pressure difference across said valve member is below a predeterminable first threshold value. The static pressure differential across the valve member typically corresponds to the pressure difference between the inlet port and the outlet port. The valve automatically closes and therefore prevents refilling of the container, if the filling pressure is too high. Especially when the valve is used on containers containing pressurised gases, the liquid provided by the fluid source has a considerable pressure. If conventional systems are used for refilling a container with a valve according to this aspect of the invention, the valve will immediately close and will prevent refilling.

According to a preferred embodiment of the invention, the valve member has force-generating means. The force-generating means are adapted for providing a balancing force to the valve member and for bringing the valve member into the first position when the filling condition is fulfilled. There are different embodiments for such force-generating means.

The force-generating means may be formed by a spring. The spring presses the valve member into said first position and maintains the valve member in the first position. The spring e.g. moves the valve member away from a valve seat in a direction towards the inlet port. As soon as the force acting on the valve member created by the pressure differential across the valve member is greater than the force provided by the spring, the valve is moved back and pressed against the valve seat. As soon as the filling pressure of the fluid source becomes too high, the valve member closes and filling of a container provided with such a valve is prevented.

According to another embodiment of the invention, the valve member is provided with an internal part comprised in said valve. The internal part can be operatively connected with an external part, which is not comprised in the valve. When the internal and the external part are in operative connection, the valve member is brought into and maintained in the first i.e. open position.

There can be magnetic force-generating means. The internal part can e.g. be provided by a first magnet, which provides a balancing force in a direction directed towards the inlet port when the valve is brought into proximity with an external part, which has a second magnet. Such a system has an enhanced security. If conventional fluid sources are used to refill a container with such a valve, the valve member will not be brought into and maintained in the first position. At the latest when refilling of the container is started, the valve member is immediately brought into the second position, if no external part including an appropriate magnet is provided in connection with the fluid source. As the magnet only has a limited force to maintain the valve member in the first position, the valve member will be brought into the second position even if a magnet of an external part is present as soon as the filling pressure of the fluid source exceeds a certain level. In order to refill a container with such a valve, both an external magnet and appropriate filling pressure must be provided.

When the container is completely filled, the content of the container is kept in the container because of the closing member. The closing member may be formed as a check valve. Check valves are commonly used in context with pressurised gas cylinders. When the filling pressure is sufficiently high, the check valve automatically opens and allows filling of the container. When the inside pressure of the container is above the ambient pressure, the check valve closes and prevents evaporation or leakage or contamination of the content in the cylinder. For emptying the cylinder, the check valve must be opened by external means, which are known to those skilled in the art.

According to a further embodiment of the invention, the check valve and the valve member may be formed on the same body. The common body for the check valve and the valve member is movable in a chamber of the housing between the inlet and the outlet port.

In order to allow refilling of the container, the check valve may comprise a pin attached to an end directed towards the inlet port. When a user presses the pin, the check valve opens and allows filling or emptying of the container.

According to a further preferred embodiment of the invention, the housing includes a chamber, which is divided into an upstream chamber and a downstream chamber. Downstream in the context of the present invention refers to a direction substantially along the direction of fluid flow from the fluid source to the container, which is to be filled. The term upstream refers to a direction substantially opposed thereto. The upstream chamber is adapted for reciprocatingly accommodating the closing, member, e.g. the check valve. The downstream chamber is adapted for reciprocatingly accommodating the valve member, which can be moved between the first and the second position within the downstream chamber.

According to a further embodiment of the invention, the downstream chamber is especially adapted to receive a valve member associated with a magnet as described above.

According to a further aspect of the invention, there is provided a system for filling a container with a fluid exclusively from an authorised fluid source. While the invention is especially suitable for filling and refilling containers with pressurised gases such as $CO_2$, the invention can be used for any type of fluid. In particular, the invention is suitable for gases with a relatively high liquefaction temperature or liquids having a relatively high vapour pressure. In particular, the invention is suitable for gases, which have vapour pressures that are substantially higher than ambient atmospheric pressure.

The system according to the invention comprises a pressure regulating means. The pressure regulating means is in fluid communication to the fluid source. The pressure regulating means is further adapted for a connection with a valve on a container as described above. The pressure regulating means is designed to maintain the pressure of the fluid supplied to the container below a predetermined or a predeterminable second threshold. The second threshold is selected in such a way that the valve member of the valve is brought into and maintained in the first position during the filling procedure, i.e. such that the pressure differential across the valve member remains below the first threshold.

According to a preferred embodiment of the invention, the system can be provided with fluid flow rate sensing means. The sensing means are used to measure the flow of liquid into the valve and into the container. The system further comprises control means operatively connected to the pressure regulation means and to the flow rate sensing means. If during the filling procedure, the delivery pressure of the fluid becomes too high, the valve member closes and filling is prevented. If the valve member closes, the fluid flow rate sensing means detects that there is no fluid flow. By means of the control means, the delivery pressure of the system can be reduced such that the valve member will be again brought into the first position.

According to still a further embodiment of the invention, the pressure regulating means is adapted for providing a delivery pressure of a predetermined minimum magnitude and for increasing the delivery pressure in a predetermined or in a predeterminable manner, e.g. in a manner controllable via said control means.

At the beginning of the filling process, the inside pressure in the container in many cases is about similar to the ambient pressure. The filling pressure therefore should be above the ambient pressure and below the second threshold. The second threshold initially corresponds to the sum of the ambient pressure and the first threshold i.e. the level of pressure difference across the valve member at which the valve member is moved into the second position.

When the inside pressure in the container reaches the filling pressure, the pressures equilibrate and refilling is stopped. At this moment, the control means, initiate the pressure regulation means to increase the delivery pressure. The increase is selected in such a way that the fluid flow rate remains within a predetermined range.

According to still a further embodiment of the invention, the system may be provided with an external part which may be brought into operative connection with an internal part arranged within the valve as described above. According to this aspect of the invention, refilling of a container provided with the valve is only possible if an operative connection between the external part of a filling system and an internal part of the valve is provided. There are a plurality of possible means for an operative connection, such as magnetic but also mechanical connecting means.

According to a further aspect of the invention, there is provided a container that has an opening closed with a valve as described above. The valve especially can be permanently attached to the opening of the container, such that it cannot be removed from the container without destruction of the container. In this way it is ensured that such containers cannot easily be provided with different valves allowing refilling with any known type of refilling system.

According to still a further aspect of the invention, there is provided a method for filling a container with a fluid from a fluid source. The method is especially adapted for filling a container having a valve as described above. In a first step of the method, the valve attached to an opening of the container is connected to the fluid source. In a second step, the container is filled with said fluid whereby the delivery pressure of the fluid at an inlet port of the valve is controlled in such a way as to keep the pressure difference across the valve member of the valve to remain below the predetermined or predeterminable first threshold.

During the step of filling, initially, there can be provided a static delivery pressure to said inlet port of the valve which is less than the sum of the ambient pressure and the first threshold. This pressure can be provided for a predetermined or predeterminable period of time. After this step, the delivery pressure can be increased in a plurality of further steps or continuously. Because of the increased delivery pressure, no equilibrium between the delivery pressure and the internal pressure in the container is achieved until the desired final pressure, is reached.

According to a further preferred embodiment of the invention, the fluid flow rate is measured during the refilling or filling of the container. If the fluid flow rate is decreasing, the magnitude of the delivery static pressure is then increased by a predetermined step. The steps of measuring the fluid flow rate and of increasing the delivery static pressure are continued until the measured fluid rate is zero. A fluid rate of zero is an indication that an equilibrium between the maximum delivery pressure of the fluid source and the content of the container has been reached as the delivery pressure cannot be increased above the maximum allowable pressure, i.e. the pressure of the fluid in the fluid source. It is also possible that the increase of delivery pressure was too high and that the valve has closed before the desired internal pressure has been achieved.

According to a further embodiment of the invention this problem is avoided. The static pressure at the inlet port can be continuously measured. If the static pressure is near to a predetermined third threshold value, which is of the magnitude of the pressure of the container when full, the filling operation is discontinued and the valve is disconnected from the fluid source.

If the static pressure measured is less than the predetermined third threshold value, filling of-the container is discontinued. The pressure in the valve upstream of the outlet port is released and filling of the container is resumed and filling is made as described above. Releasing of the pressure allows reopening the valve member.

This sub-step for distinguishing between the conditions is particularly suitable for gases behaving substantially as ideal gases such as oxygen or nitrogen.

According to a further embodiment of the invention, the container may be weighed before and during the filling procedure. If the flow rate becomes zero and if the weight of the container has not reached the expected amount corresponding to a fully filled container, this is an indication that the container is not full.

The present invention is basically based on the idea, that a container is provided with a valve preferably permanently connected to an opening of the container, wherein the valve can only be opened to allow the filling of the container when the valve is connected to an authorized filling system, i. e. when predetermined filling conditions are fulfilled.

Figure 1B:
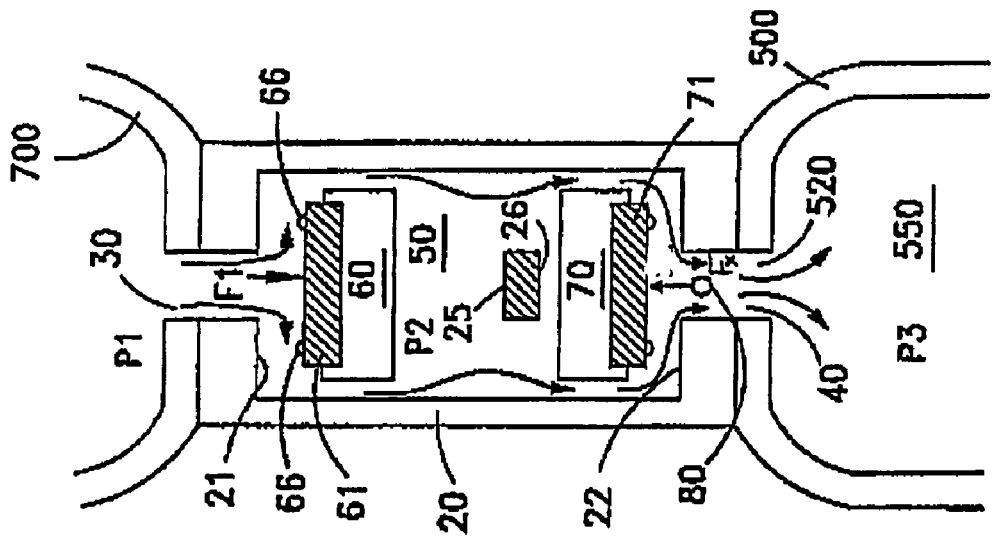
Figure 1C:
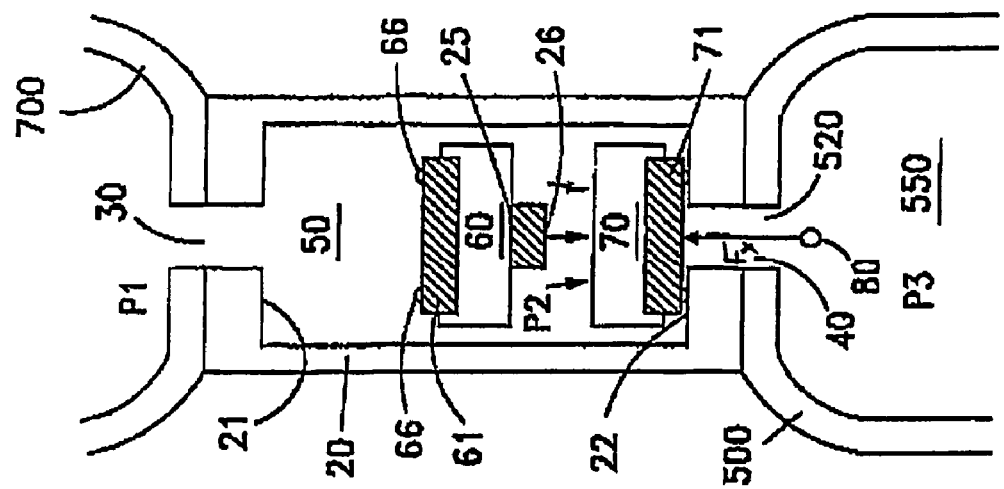
Figure 1D:
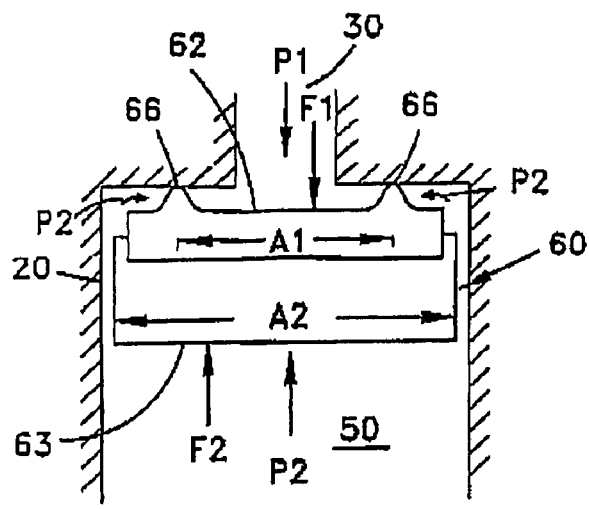
Figure 1E:
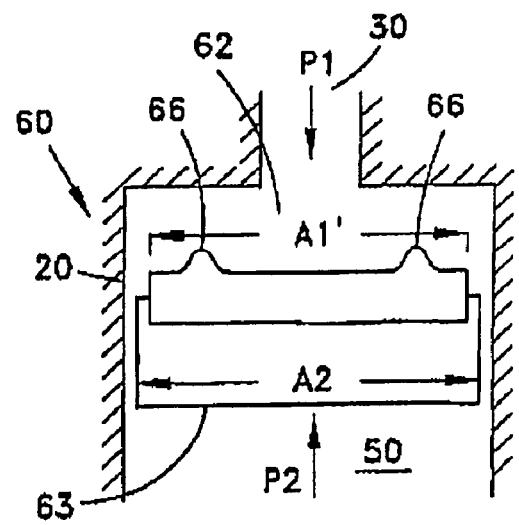
Figure 1F:
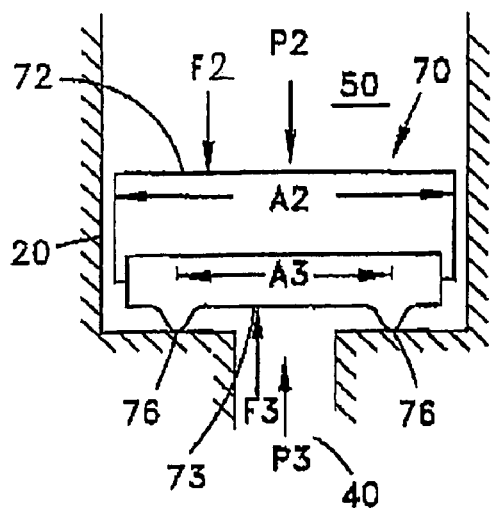
Figure 1G:
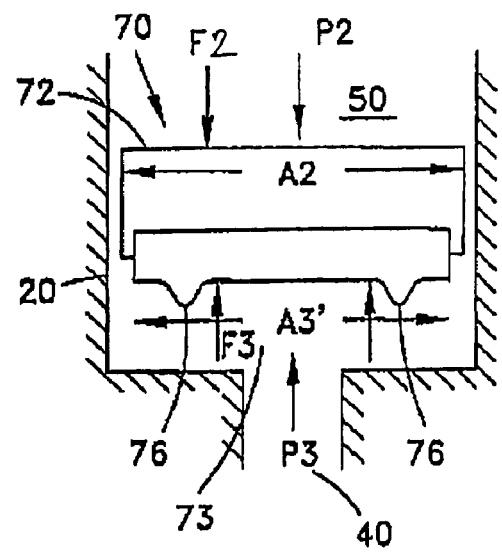
Figure 5:
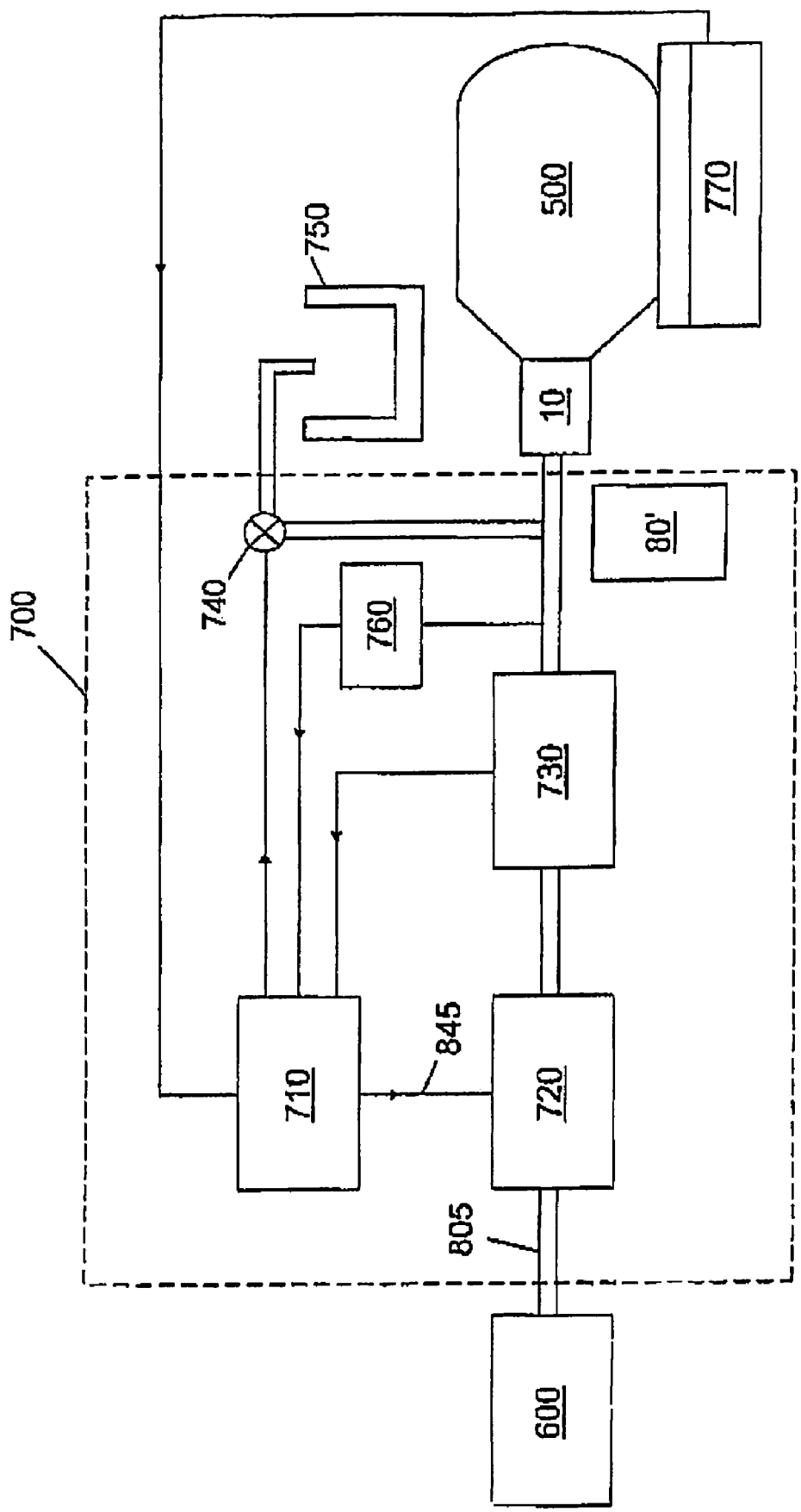
Figure 6:
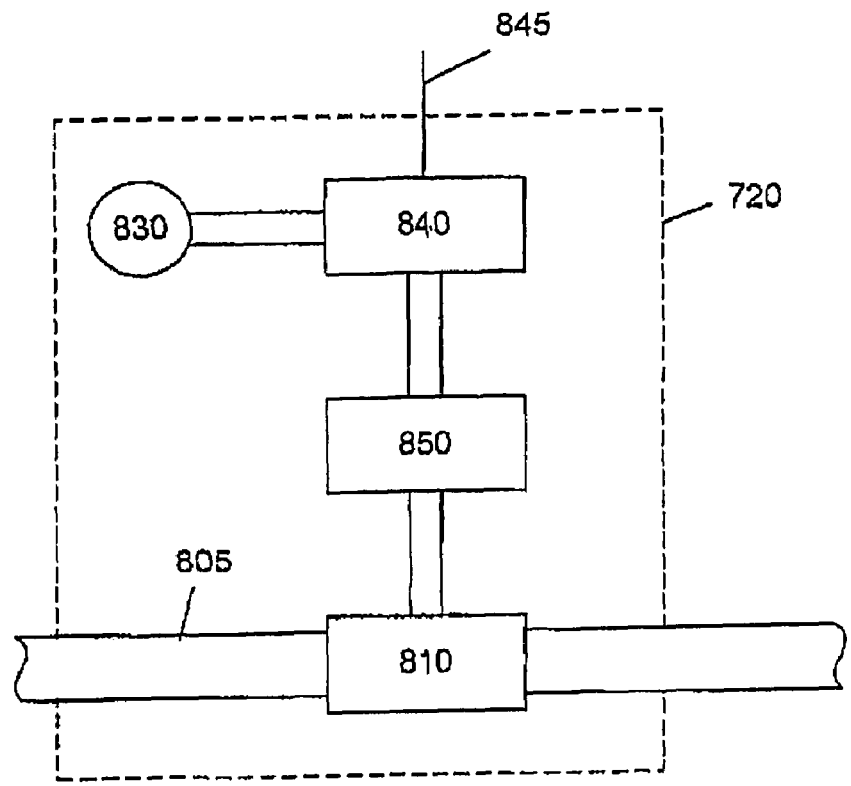
Figure 7:
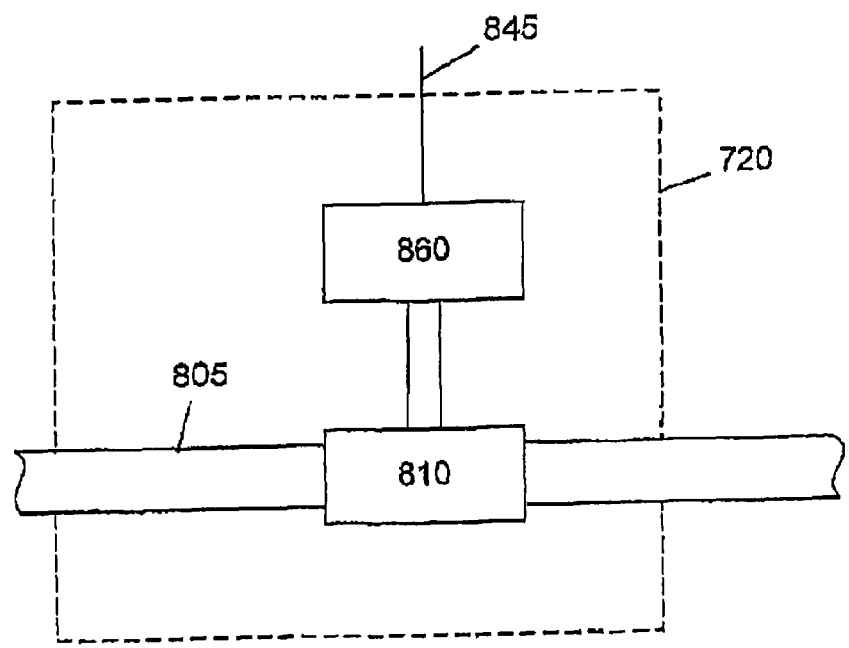
Figure 8:
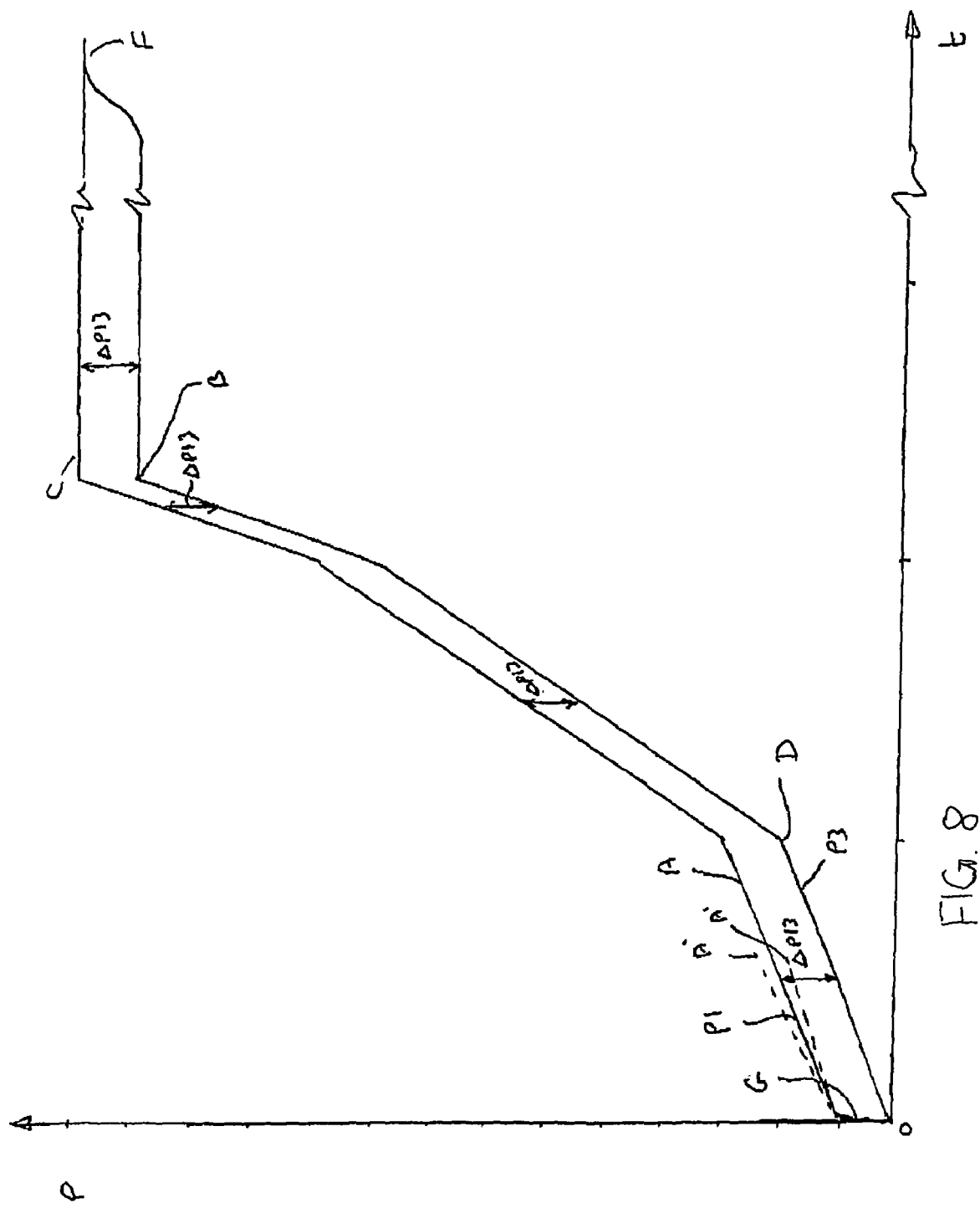

The invention will be better understood through the following illustrative and non-limiting detailed description of preferred embodiments and with reference to the accompanying drawings, wherein:

FIGS. 1$a$-1$c$ illustrate, in a cross-sectional transverse view, the main elements of a valve according to a first embodiment of the present invention, in three different operating positions, FIGS. 1d and 1e illustrate, in fragmented cross-sectional transverse view, an enlarged view of a closing member of the valve according to FIGS. 1a-1c in a static operating mode and in a dynamic operating mode, respectively, FIGS. 1f and 1g illustrate, in fragmented cross-sectional transverse view, an enlarged view of the valve member of FIGS. 1a-1c in a static operating and in a dynamic operating mode, respectively, FIGS. 2a-2c illustrate, in a cross-sectional transverse view, the main elements of a valve according to a second embodiment of the invention in three different operating positions, FIGS. 3a-3c illustrate, in a cross-sectional transverse view, the main elements of a valve according to a third embodiment of the invention in three different operating positions, FIGS. 4a-4c illustrate, in a cross-sectional transverse view, the main elements of a valve according to a fourth embodiment of the invention in three different operating positions, FIG. 5 illustrates schematically the main elements of the preferred embodiment of a system according to the present invention, FIG. 6 illustrates schematically the main elements of a configuration of the pressure regulation means of FIG. 5, FIG. 7 illustrates schematically the main elements of another embodiment of pressure regulation means of FIG. 5 and FIG. 8 illustrates changes in delivery pressure with respect to time for a typical filling operation using a system as shown in FIGS. 5-7.

FIGS. 1a-1c illustrate a first and basic embodiment of the valve according to the present invention. The valve 10 comprises a housing 20 with an inlet port 30 and an outlet port 40. A chamber 50 is defined between the inlet port 30 and the outlet port 40. The chamber 50 may be in any suitable form, including one or more interconnected cavities, conduits or the like such as to provide fluid communication between the inlet port 30 and the outlet port 40.

The upstream end of the housing 20 and particularly the inlet port 30 is adapted for connection to a suitable fluid source 600 (see FIG. 5). Connection may be made via a system 700 according to the present invention. The fluid source may include any suitable source such a pressurized tank, a container or a fluid distribution system without being limited thereto. The downstream end of the housing 20 and in particular the outlet port 40 is adapted for connection to a suitable container 500 that is desired to be filled or refilled with a fluid from the source 600. Such a container is typically in, but not limited to the form of a pressurizable cylinder. The container 500 comprises a container inlet 520 and a holding volume 550 for the fluid. The housing 20 of the valve 10 is preferably adapted for permanent connection to an opening of the container 500. It can be formed integral therewith, welded thereto, bonded thereto or otherwise permanently joined thereto. A reversible connection, which can be useful for maintenance or repair, is also conceivable. In either case, when connected to the housing 20, a fluid communication is established between the holding volume 550, the container inlet 520 and the outlet port 40 of the valve 10.

The housing 20 comprises a closing member in the form of a closing member 60 that is reversibly movable, typically reciprocatingly, between a closed upstream position and an open downstream position. The closing member 60 comprises a face seal 61 at an upstream end thereof that sealingly abuts a valve seat 21 comprised in an inner part of the housing 20 at the inlet port 30 when it is in the upstream position. This position is shown in FIG. 1a. For dispensing fluid from the container 500 via the valve, a pin or a similar device may be inserted into the inlet port 30 to depress the closing member 60 in a downstream direction. Alternatively, the first valve may be provided with a pin (not shown) projecting through the inlet opening 30. In the downstream position, the face seal 61 is distanced from the valve seal 21 (see FIG. 1b). Thus, fluid communication between the inlet port 30 and thus a fluid source connected to the inlet port and the chamber 50 in the valve 10 is allowed.

Optionally, a suitable downstream stop 25 may be provided in the housing 20, placing a limit on the downstream position. The closing member can have any position from a minimally opened position just enabling fluid communication to the maximum open position illustrated in FIG. 1c, where the closing member 60 is against the stop 25.

The closing member 60 comprises an upstream face 62. Upstream face 62 may include a face seal 61. Delivery static pressure P1 from the system 700 acts on to the upstream face 62. The sealing assembly 60 further has a downstream facing surface 63 on which the chamber static pressure P2 is acting.

The face 62 comprises a protrusion 66 which may have a closed shape such as a circle over the surface of the face 62. The protrusion 66 defines the sealing perimeter of the face seal 61 with respect to a valve seat 21. Under static conditions, the effective area of the face 62 is given by the enclosed area A1 bounded by the protrusion 66. It is usually less than the corresponding area A2 of the surface 63 (see FIGS. 1a-1g).

The condition for the closing member to open is that the downstream force F1 given by the product of the delivery pressure P1 and the effective area A1 is greater than the upstream force in the chamber 50. The upstream force F2 is given by the, product of the chamber pressure P2 and the area A1. Once the closing member 60 is open and dynamic conditions exist, the effective area A1' of the face 62 becomes equal to the area A2 (see FIG. 1e).

The closing member 60 is configured to move to the open downstream position responsive to a first force F1 of a minimum magnitude applied thereto. The minimum magnitude corresponds to a positive fluid static pressure difference $\Delta P1$ (P1–P2), which exists between the inlet port 30 and the chamber 50. The pressure difference may be generated during the operation of the valve 10 after the initial opening force F1 provided by a sufficiently high delivery pressure $P1 \geq P2$. The closing member moves to the closed upstream position corresponding to a positive fluid pressure difference existing between the chamber 50 and the inlet port 30. Optional urging means (not shown) such as a coil spring may be provided to urge the closing member towards the closed upstream position.

The value of P2 will generally depend on the downstream back pressure P3 provided by the container. As the container fills up with fluid, P3 will increase and P2 will tend to equalise with P1. However, once the first closing member 60 is fully open, the pressure P2 is still below P1 due to the restriction caused by inlet port 30, whether the fluid flowing therethrough is in the gaseous or liquid state.

The housing further comprises a valve member 70 which is reversibly movable, typically reciprocatingly, between a first, open, upstream position and a second, closed, downstream position. The valve member 70 comprises a face seal 71 at a downstream end thereof that sealingly abuts a valve seat 22 comprised in an inner part of the housing 20 at the outlet port 40 when the valve member is in the second downstream position (see FIG. 1c). In the first upstream position (see FIG. 1b) the face seal 71 is distanced from the valve seat 22 and allows fluid communication between the chamber 50 and the outlet port 40 and thus also between a container 500 connected to the outlet port 40. A suitable upstream stop 26 which can be integral with the downstream stop 25 may be provided in the housing 20 and place limit on upstream travel of the valve member 70. The first position can include any position from minimally opened to the maximum open position shown in FIG. 1a.

The valve member 70 comprises an upstream face 72 on which acts chamber static pressure P2 and a downstream facing surface 73 which may include a face seal 71, on which acts the back static pressure P3 from the container 500. The face 72 has a protrusion 76 typically in the form of a closed shape such as a circle over the surface of the face 72 to define the sealing perimeter of the face seal 71 with respect to the valve seat 22. Under static conditions, the effective area of the face 73 is given by the enclosed area A3 bounded by the protrusion 76 and is generally less than the corresponding area A2 of the surface 73. The condition for the valve member assembly 70 to open is that the upstream force F3 given by the products of the back pressure P3 and the effective area A3 plus a balancing force provided by force-generating means 80 is greater than the downstream force F2 in the chamber 50 given by the product of the chamber pressure P2 and the area A3. When the valve member 70 is open and dynamic conditions exist, the effective area A3' of the lower face 72 becomes equal to the area A2.

The valve member 70 is thus configured to move to said second position responsive to a third force P3 of predetermined minimum magnitude that may be applied to the valve member 70 corresponding to a second positive fluid static pressure difference $\Delta P3$ (=P2−P3) that may exist between the chamber 50 and the outlet port 40, generated for example during operation of the valve 10.

When both, the closing member 60 and the valve member 70 are open, fluid flows from the fluid source to the container since the pressure difference P1−P3 is positive. The pressure P2 is still greater than P3 due to the restriction caused by outlet port 40 and due to the fact that the container 500 takes time to fill and does create the back pressure equal to P2, whether the fluid flowing therethrough is in the gaseous or liquid state. When the container is full of liquid, then P1, P2 and P3 equalise and no more fluid flow is possible.

Alternatively, the face seal and the valve seat arrangement for the closing member 60 and the valve member 70 may be replaced with other types of known sealing arrangements. While the closing member 60 and the valve member 70 are illustrated in FIGS. 1a-1c as reciprocatable along a common axis, the longitudinal axis 100 of the valve 10, each one of the closing and the valve member 60, 70 may move along axis which are not mutually co-aligned and/or that are not aligned with the axis 100 of the valve 10.

The valve 10 further comprises at least a part of a suitable force-generating means 80. The force-generating means 80 provides a balancing force Fx to the valve member 70 at least during operation of the valve 10. The force-generating means may be comprised in its entirety in the housing and thus continuously provide the required balancing force Fx. It may e.g. be in the form of a coiled spring. Alternatively, the force-generating means 80 may be only partially comprised in the valve 10 and in the housing 20. A complementary part (see eg. FIG. 5) of the force-generating means 80 can be provided externally to the valve 10 only during operation of the valve 10 with a compatible and authorized filling system 700.

When a nominally empty suitable container 500 is connected to the outlet port 40 such as to provide fluid communication there between, three different scenarios are possible for the valve 10:

a) The container 500 may have a residual pressure, i. e. the container is not completely empty. In this case, the residual pressure maintains the closing member 60 in the closed position as shown in FIG. 1a. The valve member 70 may be urged to the first position responsive to the balancing force Fx provided by the force-generating means 80. If this force Fx is absent, the valve member 70 may comprise any position within the housing 20. This scenario a) may be routinely avoided by venting the container 500 prior to refilling thereof.

b) The container may be at ambient pressure. The closing member 60 is typically in the open position. It probably abuts the stop 25. The valve member 70 may be urged to the first, open position responsive to the balancing force Fx provided by the force-generating means 80. If the balancing force is absent, the valve member 70 may comprise any position in the housing 20, typically the second position.

c) Rarely, the container 50 may be at a lower pressure than ambient pressure, e.g. when the container has been emptied at an altitude with low ambient atmospheric pressure and when it is desired to refill-the container at a lower altitude. In this situation, the closing member 60 is in the open position and abuts the stop 25. If the force-generating means 80 is providing the balancing force Fx, this will be sufficient to overcome the vacuum effect and to open the valve member 70 until pressure equalizes between the container 500 and the ambient atmosphere. If the force Fx is absent, the valve member 70 will remain at the closed second position. In such a case, the balancing force Fx must be generated to permit equalization of the pressures.

When an unauthorized fluid source is connected to the valve inlet port 30, the relatively large fluid delivery pressure associated with such known sources generates a relatively large first force F1 opening the closing member 60 and abutting the same against the stop 25. Almost simultaneously, the same high delivery pressure P2 provides a large second force F2 to the valve member 70 due to the relatively large pressure difference with respect to the pressure P3 within the container 500. The only force available to counter the large second force F2 is the balancing force Fx provided by the force-generating means 80. If the magnitude of the force Fx is chosen such that it is to small to counter the force F2 in cases other than when there is a small static pressure difference across the valve member 70, the valve member 70 is moved into the closed position.

If it is attempted to fill the container 500 at a constant delivery pressure of a low magnitude, the filling process will end as soon as the pressures are equalised. The container will only be partially filled. An unauthorised user attempting to fill the container by manually increasing the delivery pressure to keep the valve open will have difficulties to precisely control the delivery pressure. Fine controlling would inevitably require an extremely lengthy time period and such unauthorised user may be generally deterred.

If the valve 10 only comprises an inner part of force-generating means, no balancing force Fx is provided unless the activity of the complementary external part 80' is duplicated by an unauthorised user. The valve member 70 will therefore shut. This applies when the valve 10 and the container are in scenario b) or c). In scenario a), either there is no flow because the delivery pressure is less than or equal to the residual pressure in the container. If the delivery pressure is greater than the residual pressure, the pressure difference will immediately close the valve member if no balancing force Fx is provided.

The fluid filling system 700 according to the invention is adapted for controlling the delivery pressure of the source 600 (see FIG. 5) at least just upstream of the valve inlet port 30. Filling is started with a very low delivery pressure. The delivery pressure is incremented in a predetermined manner. Essentially, starting at a low delivery pressure, the static pressure in the chamber 50 is also low and thus $\Delta P1$ is small, giving rise to a small force F1 sufficient to open the closing member 60. The closing member 60 may also be kept in the open position by means of a mechanical pin or equivalent not shown in a similar manner to that used when it is desired to dispense fluid from the container 500.

Although at this point, the static pressure P2 in the chamber 50 increases as the fluid flows therethrough into the container, the difference in static pressure $\Delta P3$ or P2–P3 between the chamber 50 and the container is small and the downstream force F2 generated thereby on the valve member 70 is counteracted by the balancing force Fx. The magnitude of the balancing force Fx is chosen according to the type of fluid in, the source 60 and to the mechanical characteristics of the valve 10. If the delivery pressure from the source 600 at the inlet port 30 is even a little higher than a nominal starting value, $\Delta P3$ will be greater than aforesaid and will generate a downstream force F2 which is greater than the balancing force Fx, causing the valve member 70 to move to the second position and thus to close the valve 10. As fluid flows through valve 10 into the container 500, the static pressure P3 of the container 500 begins to increase and thus eventually would equalise with the delivery pressure P1. This would result in the container 500 being partially filled until the pressure equalises. If an unauthorised user wishes to circumvent the system 700 by providing a very low delivery pressure, the low amount of fluid that can be provided would act as deterrent for such unauthorised use.

According to the invention, the fluid filling system 700 is adapted for incrementally increasing the delivery static pressure P1 at the inlet port 30 such as to maintain the pressure difference across the valve, i.e. P1–P2, and therefore $\Delta P3$ substantially constant in registry with the increasing back pressure P3 of the container 500, the value of $\Delta P3$ being that to provide a force substantially equal to the balancing force FX. In other words, the system 700 first provides a very low delivery static pressure to the inlet port 30 and thus to the chamber 50, and as the back pressure from the container 500 increases due to accumulation of fluid therein, the delivery pressure P1 is increased in a controlled manner such as to maintain $\Delta P3$ constant, correlated to the value of the balancing force Fx. Only if a complimentary and authorised filling system 700 is used, it is possible to completely fill the container 500 within a reasonable time frame.

Instead of the embodiments shown in FIGS. 1a to 1g, different constructions of the valve are conceivable whereby the valves operate as described above. According to the second embodiment shown in FIGS. 2a to 2c, the closing member and the valve member are integrated into a single combined valve assembly 260. The valve sealing assembly 260 comprises a face seal 261 at an upstream end that sealingly abut a valve seat 221 comprised in an inner part of the housing 220 at the inlet port 30, when in a closed upstream position (see FIG. 2a). For dispensing the fluid from the container 500 via the valve 210, the valve assembly typically comprises a pin 290 that projects through the inlet opening 30. By depressing the pin 290, the assembly 260 is moved to open the inlet port 30. In the open downstream position (see FIG. 2b) the face seal 261 is distanced from the valve seal 221 and allows fluid communication between the inlet port 30 and the chamber 250. The assembly 260 comprises a face seal 271 at a downstream end thereof which sealingly abuts a valve seat 222 comprised in an inner part of the housing 220 at the outlet port 40 when it is in the closed position as shown in FIG. 2c. In the position shown in FIG. 2b, the face seal 271 is distanced from the valve seal 222 and allows fluid communication between the chamber 250 and the outlet port 40. The container can be filled when the assembly 260 is in the position shown in FIG. 2b. The assembly 260 has an upstream face 262 on which acts delivery static pressure P1 from the system 700 and a downstream facing surface 273 on which acts the back static pressure P3 from the container 500. The effective areas of the faces 262 and 273 are substantially the same when the assembly 260 is open and is operating dynamically. According to this embodiment, the force-generating means comprises a spring 280, typically a helical a spring, which abuts at its upstream end a spigot 270 that depends in a downstream direction from the valve assembly 260 and which abuts at its downstream end a suitable shoulder 285 comprised in the housing 220. When depressed, the spring 280 stores elastic potential energy and provides a restoring or a balancing force Fx in the upstream direction to the valve assembly 260. When the force F1 provided as a result of the pressure difference between the inlet port 30 and the outlet port 40 is to large, e.g. when it is attempted to fill the container 500 without using an authorised system, this relatively large force overcomes the resistance of the spring 280, which compresses into recess 286 enabling the valve assembly 260 to move to a closed position so as to close the outlet port 40 (FIG. 2c).

Such springs can be used with a valve member different from the one shown in FIGS. 2a to 2c.

A valve according to a third embodiment of the invention is shown in FIGS. 3a to 3c. It comprises all elements of the first embodiment of the valve 10 as described above with the differences described herein below whereby like parts have like reference numerals increased by 300. The valve 310 comprises a housing 320 with a chamber 350, which is divided into an upper sub-chamber 351 and a lower sub-chamber 352. The upper sub-chamber 351 comprises a closing assembly 360 movable therein. The lower sub-chamber 352 comprises the valve member 370 movable therein. The closing member 361 is formed in a similar way as in the second embodiment. Optionally, the closing member 360 may comprise a restoring spring 374 which abuts at its upstream end a spigot 376 that depends in a downstream direction from the closing member 360 and which abuts at its downstream end a suitable shoulder 385 comprised in the housing 320. The restoring spring 374 urges the closing member 360 into a closed position even when the static pressure in the valve 310 is not greater than the external pressure and the force generated by the spring 374 is generally lower than the magnitude of first force F1 at least at the beginning of the filling process. When the spring 374 is fully compressed, there is still a fluid communication between the upper sub chamber 351 and the lower sub-chamber 352 (see FIG. 3c). Spring 374 is provided to ensure that the container 500 is closed after it has been completely emptied in order to avoid contamination of the interior of the container 500.

According to this embodiment, the force-generating means 80 comprise an internal part 380" comprised in the valve 310 and a complementary external part 380 that is typically comprised in the system 700 according to the invention. The internal part 380" is in the form of a magnetic element 381 comprised in the valve member 370. In FIGS. 3a to 3c, the magnetic element 381 forms the main body of the valve member 370. It is reciprocatable in the lower sub-chamber 352 which may have its axis 200 orthogonal with respect to the longitudinal axis 100 of the valve 310. The magnetic element 381 may also be separate to and included in the valve member 370. The magnetic element 381 is arranged such as to have a particular pole, e.g. its north pole, facing towards the outside of the housing 320 and thus typically also away from the axis 100 of the valve 310. The magnetic element 381 is arranged aligned with the axis 200 of the lower sub-chamber 325. The complementary part 380' also comprises a magnetic element 382. If the complementary part 380" of the force-generating means is brought into proximity with the valve 310 such that similar poles are facing each other as shown in FIGS. 3a to 3c, the external part 380 has its north pole facing the north pole of the magnetic element 381. The balancing force Fx in this embodiment is provided by the magnetic repulsion between the magnetic elements 381 and 382, which serves to urge the face seal 361 away from the valve seat 322. If it is attempted to use the valve 310 with a system 700 without an external part 380', no balancing force Fx will be generated and the valve member 370 is free to move back to a closed position. As soon as the inlet port 30 of the valve 310 is exposed to a delivery pressure above the static pressure in the container 500, the valve member 370 closes the outlet port 40.

The valve according to the forth embodiment of the invention shown in FIGS. 4a to 4c comprises all the elements of the first embodiment of the valve 10 with the difference described herein below. Reference numerals increased by 400 refer to similar parts as in the third embodiment. The, downstream end of the spring 474 is accommodated in a suitable well 485 comprised in the housing 420 as compared to the accommodation of the down-stream end of the spring in the third embodiment. The main difference between this embodiment and the third embodiment is, that in this embodiment the force-generating means 80 operates by means of magnetic attraction between two elements, rather than by magnetic repulsion. The internal part 480" in the forth embodiment may be in the form of a magnetisable element 481 comprised in the second valve member 470. It may comprise a ferrous core and form the main body of the valve member 470. During proper operation of the valve 420, a complementary part 480' of force-generating means 80 is brought into proximity with the valve 410 such that one of the poles of the magnetic element 482 is aligned with the axis 300 of the valve member 470. The balancing force Fx in this embodiment is provided by the magnetic attraction between the magnetic element 482 and the magnetisable element 481. The operation of the valve according to the force embodiment is similar to the operation of the valve according to the third embodiment. Alternatively, the internal part 480" of the force-generating means 80 may comprise a magnetic element with its poles arranged such as to provide a magnetic attraction force when brought in operative connection with an external part 480' of the filling system 700.

As mentioned above, the force-generating means 80 is calibrated to provide a suitable balancing force Fx of a magnitude that is chosen according to the fluid being used in conjunction with the valve according to the invention. When the fluid is a liquid with low evaporation point, such as petrol and the like, or a gas with low liquefaction point, for example carbon dioxide, it quickly forms a liquid deposit in the container 500 which is otherwise filled with the gaseous or vapour phase of the liquid, which in turn provides aforesaid back pressure P3.

This back pressure generally depends on the nature of the fluid and the temperature thereof and varies from fluid to fluid. As soon as some liquid forms in the container the vapour pressure remains constant as more liquid forms, so long as the temperature remains constant. In practice, however, the expansion of the gas into the container 500 results in the cooling thereof and thus in a lower vapour pressure than at ambient temperature. As the container 500 is filled some more and the temperature stabilises and begins to increase, the vapour pressure similarly increases and eventually stabilises being a function of the temperature in the container 500 and independent of the level of liquid phase therein so long as some minimum quantity thereof exists therein.

Essentially, then, for all embodiments, the valve member remains open during filling operation of the container when the positive pressure difference between the delivery fluid pressure P1 and the container fluid pressure P3 (that is the positive pressure difference $\Delta P13$ between the first and/or the second end of the valve) is not greater than a particular value such that the causing force acting on the valve member corresponding to the pressure difference may be countered by the balance force Fx and does enable the valve to remain open.

Thus for a given fluid delivery pressure, the value of $\Delta p13$ will vary, according to the particular vapour pressure of the fluid. Since the magnitude of the balancing force Fx is related to $\Delta p13$, account must be taken of the nature of the fluid when choosing Fx. Thus, for example, if a valve in which the force-generating means 80 provides a particular balancing force that is appropriate for carbon dioxide, that has a relatively large vapour pressure, is used for filling a container 560 with a fluid of lower vapour pressure, the balancing force Fx would be insufficient to maintain the second valve assembly 70 open. This is because the magnitude of $\Delta p13$ provided by the system would result in a force that is larger than Fx, causing the corresponding valve member to close. On the other hand, if it is attempted to use the same valve with a fluid having substantially higher vapour pressure than the nominal value for the valve, than the valve can still operate.

On the other hand, gases with very low liquefaction point, such as $O_2$, $N_3$ and so on, behave more or less as ideal gases, and thus the back pressure will continually increase as the delivery pressure increases.

The valve according to the present invention is therefore adapted to operate, i.e., to enable a container attached thereto to be filled, only under specific conditions:

a) that a suitable balancing force Fx is present at least during filling of the reservoir, and b) when the delivery pressure P1 at the inlet port of the valve begins at a specific very low magnitude and is subsequently increased in a manner such as to provide a closing force to the valve member that is not greater than the balancing force generated by the force-generating means of the valve, as the back pressure P3 from the reservoir increases.

Accordingly, the fluid filling system 700 according to the invention comprises the features necessary to provide these conditions.

Thus, and as illustrated schematically in FIG. 5, a preferred embodiment of the fluid filling system 700 of the present invention comprises a suitable pressure regulating means 720 operatively connectable to the fluid source 600, and a suitable fluid flow rate sensor means 730 operatively connected to the pressure regulating means 720 and operatively connectable to the valve 10 according to the invention. While the valve 10 according to the first embodiment of the invention is schematically illustrated in FIG. 5, the description of the system 700 is similarly applicable to other embodiments of the valve, mutatis mutandis. The system 700 further comprising suitable control means 710 operatively connected to the pressure regulating means 720 and to the fluid flow rate sensor means 730, and provides control of the pressure regulating means 720 according to the fluid flow rate measured by the fluid flow rate sensing means 720.

According to the type of valve 10 used with the system 700, the system 700 may also comprise a complementary external part 80' of said force-generating means 80 such that when the valve 10 is operatively connected to the system 700, and at least when the system 700 is in operation, an appropriate balancing force Fx is generated in the valve 10.

The pressure regulating means 720 comprises any suitable pressure regulator arrangement capable of delivering a delivery fluid pressure P1 that is initially very low at its output, regardless of the magnitude of the fluid pressure of the fluid source 600 connected thereto. Further, the pressure regulating means 720 is capable of being finely controlled such as to increase the output fluid pressure thereof in very small steps. Such steps may be optimised, since steep changes in pressure with respect to time may result in the valve member closing, while shallow changes in pressure with respect to time reduces the filling efficiency, resulting in long refill time for the container 500. One optimum pressure change rate found by the applicants for filling a reservoir with $CO_2$ is about 4 bars in 2 seconds.

Optionally, and as illustrated in FIG. 6 the pressure regulating means 720 may comprise a pressure regulator 810, that is connectable to the source 600 via any suitable conduit and/or connectors 805. An air pressure source 830 provides air at a predetermined high pressure to a proportional valve 840, which is operatively connected to the control means 710 via communication line 845, which serves as an additional pressure regulator that can be used to operate the pressure regulator 810. Such an arrangement may be useful when off the shelf components for the elements in FIG. 6 provide the required control over the delivery pressure, which in turn is in fluid communication with the pressure regulator 810. When the control means 710 determines that an increase in delivery pressure is required from the pressure regulating means 720, an appropriate signal is sent to the proportional valve 840 which then increases its output pressure with respect to the cylinder 850 which in turn opens the pressure regulator 810 such as to provide the desired delivery pressure to the valve 10. The control means operate in a manner known to those skilled in the art.

One advantage in using the pressure regulating means 720 of FIG. 6 is that a sufficiently sensitive and controllable pressure regulation may be provided using off the shelf components.

Optionally, and typically the system 700 further comprises suitable scales 770 or other weighing means for determining the mass or weight of the container 500 at least before the filling procedure and at the end thereof, to ensure that the container has been filled with the required amount of fluid. Preferably, the scales 770 enable the weight or mass of the container to be continually monitored during the filling operation and advantageously, the scales 770 are operatively connected to the control means 710 and are adapted for transmitting thereto a signal representative of the weight or mass of the container 500. Thus, the control means 710 continually monitors the weight or mass of the container 500 during the filling procedure. This has the advantage that if the second valve sealing means closes while the container is not yet full or within a proportion thereof, say 98% full as indicated by the low weight of mass value provided from the scales 770 to the control means 710 this indicates that the delivery pressure was too high rather than the container is full. Thus, this configuration enables the control means 710 to distinguish between a situation where the container is full to one where the cause of the valve member closing is high delivery pressure. In this case, flow rate sensor 730 could also be omitted.

Alternatively, and as illustrated in FIG. 7, the pressure regulating means 720 may comprise, as before, a pressure regulator 810 such as for example, that is connectable to the source 600 via any suitable conduit and/or connectors 850. However, the pressure regulator 810 is connected to a suitable stepper motor arrangement 860 that is adapted to enable the pressure regulator 810 to increase or decrease the delivery pressure in small steps correlated to the stepping action of the motor 860. Such stepper motors 860 are well known in the art. The stepper motor 860 is operatively connected to the control means 710 via communication line 845. When the control means 710 determines that an increase in delivery pressure is required from the pressure regulating means 720, an appropriate signal is sent to the stepper motors 860, which then rotates by the required number of incremental steps, which in turn opens the pressure regulator 810 by a corresponding amount such as to provide the desired delivery pressure to the valve 10.

Advantages in using the pressure regulating means 720 of FIG. 7 include that a sufficiently sensitive and controllable pressure regulation may be provided using off-the-shelf components, and that less components are required relative to the arrangement of FIG. 6.

The fluid flow sensing means 730 comprises any suitable fluid flow sensor or sensors capable of sensing and measuring fluid flow rates, either mass flow rate or volume flow rate or both typically from very small values such as for example a few standard cubic centimeters (sccm) to nominal flow rates including for example a few standard liters per second, and to detect small changes in the flow rate. Further the flow rate sensing means is capable of converting the fluid flow rate measured thereby into appropriate signals, typically electrical or electronic, either analogue or digital, capable of being received and processed by said control means 710. The fluid flows sensing means typically comprise a flow meter. Suitable flow meters are known in the art. Such flow meters typically provide RPM of a turbine comprised therein as a function of the flow rates passing therethrough.

The control means 710 typically comprises a microprocessor based control system, such as for example a computer externally connected to the system 700, or alternatively, and preferably, a suitable microprocessor chip integrally comprised in the system 700. In particular, the control means 710 is adapted for receiving suitable signals from the fluid flow sensing means 730 and based on these signals to provide control signals to the said pressure regulating means 720 to control the delivery output pressure P1 provided thereby.

The system 700 is normally integrally or permanently connected to a suitable fluid source 600 via the pressure regulating means 720 but could be removably connected thereto, for example to facilitate maintenance of the source 600 or system 700. When it is desired to fill a container 500, the system 700 is connected to a valve 10 (which is typically, permanently connected to container 500) via the fluid flow rate sensing means 730. Alternatively, the flow sensing means 730 may be connected to the fluid source 600, and the pressure regulating means 720 may be connected to the valve 10 mutatis mutandis. At the start of a normal filling operation of the system 700 the control means 710 commands the pressure regulating means to provide a delivery pressure P1 of relatively very low magnitude, such as to provide a differential pressure $\Delta p13$ that generates a force to the valve member that is not greater than the balancing force Fx provided by the force-generating means 80. Since the control means 710 is calibrated for a specific type of valve 10 the precise starting delivery pressure P1 that is required for operating the valve 10 is known.

Optionally, the control means 710 may be programmed for use with a plurality of valves 10 and/or for use with a multitude of different types of valves, and thus may control each valve 10 separately or simultaneously in a similar manner to that described herein, mutatis mutandis.

If at the start of the filling procedure the flow rate sensing means 730 measures a zero flow rate, this is indicative of scenario a), i.e., that the container has a residual pressure, and thus that the delivery pressure is insufficient to open the closing member 60, the container 500 can be removed, emptied and connected to the system 700 via valve 10. Alternatively, mechanical means such as a suitable pin arrangement may force the closing member 60 to open when the valve is connected to the system 700. Alternatively, and preferably, a suitable blow-off or pressure release valve 740 may be used to bleed the container 500 prior to use, as will be further described herein below.

Typically, particularly in scenario b), a small fluid flow rate will be initially detected by the fluid flow rate sensing means 730 at the beginning of operations. As marked G in FIG. 8, delivery pressure P1 typically starts at nominally zero, increasing rapidly until a back pressure P3 is detected, limiting P1 such that the positive pressure difference does not exceed $\Delta p13$. Referring to fluids such as $CO_2$ that have relatively high liquefaction points. As the container 500 begins to fill with fluid, the static pressure P3 in the container 500 increases and this part of the filling operation is marked A in FIG. 8, wherein the fluid is exclusively in the gaseous phase in container 500.

The increase in delivery pressure P1 with respect to time, may be optimised so that on the one hand it is not too high A' resulting in closure of the valve member, and not too low A" resulting in a long refill time. Preferably, the positive pressure difference $\Delta p13$ is kept constant and less than or equal to a pressure difference with respect to which the balance force Fx is calibrated. Eventually, liquid begins to form in the container 500, marked B in FIG. 8, and the fluid delivered via the valve comprises an increasing proportion of liquid with respect to the gaseous phase. Accordingly it is possible to increase the rate of change of delivery pressure P1 with time to a new value, to decrease the filling time, maintaining however the same pressure difference at least or equal to $\Delta p13$. At a certain point when a predetermined amount of liquid is formed in the container, for example when the net weight of the contents has reached 50 g, the system increases the rate of change of pressure to still a higher value, again maintaining the pressure difference across the valve at least or equal to $\Delta p13$. When a critical amount of liquid has been deposited in the container, such that the vapour pressure is constant (the temperature also having stabilised), thereafter there is a more or less constant vapour pressure as more fluid is provided to the container, marked C in the figure. Thereafter the delivery pressure P1 is kept constant at the value corresponding to the vapour pressure plus $\Delta p13$ marked C in the figure. Typically fluid flow is terminated when the net weight of the container contents reaches a predetermined limit. Otherwise, however, the container fills fully with liquid phase of the fluid, the back pressure P3 suddenly increases when the container is full, equalising with the delivery pressure P1 marked F in FIG. 10. However, during the initial mixed vapour/liquid filling phase indicated at A in FIG. 8, as more fluid is provided to the container, at some point, the vapour pressure increases as the temperature therein increases and eventually the back pressure in the cylinder equalises with the delivery pressure, so that the fluid flow rate commensurately diminishes towards zero and the delivery pressure P1 needs to be increased.

Accordingly, the control means 710 interprets a diminishing fluid flow rate sensed by the fluid flow rate sensing means 730 as indicating that the back pressure P3 from the container is increasing, and thus sends an appropriate signal to the pressure regulating means 720 to increase the delivery pressure P1 of the fluid. Thus, part A of FIG. 8, rather than being a smooth gradient may comprise a wavy profile as the delivery pressure P1 is changed in small increments according to changes in the measured mass flow.

Thus, in this manner, the control means 710 continually monitors the fluid flow rate measured by the fluid flow sensing means 730, and continually increases in very small steps the delivery pressure P1 provided by the pressure regulating means 720 whenever the fluid flow rate decreases. Thus, preferably, the control means 710 attempts to maintain a constant fluid flow rate into the container, or alternatively within an upper flow rate limit and a lower flow rate limit. Preferably, though, the control means 710 attempts to maximise the fluid flow rate into the container 500.

If for any reason the pressure regulating means 720 increases the delivery pressure P1 by too much, this leads to the valve member 70 closing the outlet port 40, and thus the fluid flow rate suddenly drops to zero. A zero fluid flow measured by the fluid flow sensing means 730 is always interpreted by the control means 710 to signify that the valve member 70 has closed, and under the circumstances i.e. when part of the container has already been filled, the control means 710 commands the pressure regulating means 720 to reduce the delivery pressure. However, when the fluid is a gas with low liquefaction point such as $CO_2$ for example, the flow sensing means 730 may be sensitive only to the flow of liquid and not to the flow of gas. Thus, at the beginning of the filling operation, marked A in FIG. 8, when only gas is flowing into the container 500, the flow sensing means will not sense any flow. However, the control means 710 can be programmed for this. Only once some liquid has formed in the container, then liquid flows through the flow sensing means 730, which then senses the flow.

At the same time, an optional pressure release valve 740 releases pressure between the pressure regulating means 720 and the chamber 50 of the valve 10, and fluid therein is vented into the atmosphere or to optional overflow tank 750.

Thus, the pressure release valve 740 is operatively connected to and controlled by, the control means 710 and operation of the pressure release valve 740 is discontinued when the pressure P2 in the valve 10, in particular in the chamber 50, has reduced sufficiently such as to enable the valve member 70 to open the outlet port 40. The delivery pressure P1 to the valve 10 can be advantageously monitored by means of an optical pressure transducer or other pressure sensor means 760, preferably disposed downstream of the pressure regulating means 720, and operatively connected to the control means 710. Once the static pressure in the valve has been sufficiently reduced, such as to open the valve member 70, fluid will once again flow into the container 500, and the control means 710 continues to increase the delivery pressure P1 of the pressure regulating means 720, as herein before described. Preferably, prior to filling a container 500, the pressure release valve 740 releases pressure between the pressure regulating means 720 and the chamber 50 of the valve 10.

The invention claimed is:

1. A valve for closing a container and for enabling the container to be filled, said valve comprising
a housing with an inlet port and an outlet port wherein said inlet port is adapted for connection to a fluid source, said connection being selected from the group of indirect and direct connections, and wherein said outlet port is adapted for connection to said container said connection being selected from the group of indirect and direct connections;
a closing member for said outlet port; and
at least one valve member which in a first position allows fluid communication between said inlet port and said outlet port and which, in a second position, prevents fluid communication from said inlet port to said outlet port, wherein said valve member is separate from the closing member and is brought into and maintained in said first position only if a static pressure difference across said valve member is below a predeterminable first threshold.

2. A valve according to claim 1, wherein said valve member has force-generating means adapted for providing a balancing force to said valve member and for bringing said valve member into said first position when said filling condition is fulfilled.

3. A valve according to claim 2, wherein said force-generating means have a spring.

4. A valve according to claim 1, wherein the valve member has an internal part comprised in said valve which can be operatively connected with an external part external to said valve for bringing and maintaining said valve member into said first position.

5. A valve according to claim 4, wherein said internal part has a first magnet or a magnetisable element providing a balancing force for bringing said valve member into said first position when said valve is brought into proximity with an external part having a second magnet.

6. A valve according to claim 1, wherein said closing member is formed as a check valve.

7. A valve according to claim 6, wherein said check valve and said valve member are formed on a body movable in a chamber of said housing between said inlet port and said outlet port.

8. A valve according to claim 6, wherein said check valve comprises a pin attached to an end of said check valve directed towards said inlet port.

9. A valve according to claim 7, wherein said housing has a chamber divided in to an upstream chamber and a downstream chamber in communication with one another,
wherein said upstream chamber is adapted for reciprocatingly accommodating said closing member, and
wherein said downstream chamber is adapted for reciprocatingly accommodating said valve member at least between said first and second position.

10. A valve according to claim 5, wherein said downstream chamber is adapted for aligning movement of said valve member in the direction of magnetic attraction or repulsion between said internal part and said external part.

11. A system for filling a container with a fluid exclusively from an authorised fluid source, comprising a pressure regulating means in fluid communication to said fluid source and adapted for connection with a valve on said container, said valve comprising
a housing with an inlet port and an outlet port wherein said inlet port is adapted for direct or indirect connection to a fluid source and wherein said outlet port is adapted for direct or indirect connection to said container;
a closing member for said outlet port;
and at least one valve member which in a first position allows fluid communication between said inlet port and said outlet port and which, in a second position, prevents fluid communication from said inlet port to said outlet port,
wherein said valve member is brought into and maintained in said first position only if a static pressure difference across said valve member is below a predeterminable first threshold;
wherein said pressure regulating means is designed to maintain the pressure of the fluid supplied to said container below a predetermined or predeterminable first threshold selected in such a way that said valve member of said valve is brought into and maintained in said first position.

12. A system according to claim 11, wherein said system has fluid flow rate sensing means for measuring the flow of liquid into said container, said system further comprising control means operatively connected to said pressure regulating means and said fluid flow rate sensor means.

13. A system according to claim 12, wherein said pressure regulating means is adapted for providing a delivery pressure of a predetermined minimum magnitude and for increasing the delivery pressure in a manner controllable via said control means.

14. A system according to claim 12, wherein during operation of the system relating to the filling of a container from a fluid source (699) connected to that system, said control means initially commands the pressure regulation means to provide a delivery pressure of a magnitude below a first predetermined threshold value and then to increase the delivery pressure, maintaining the fluid flow rate within a predetermined range.

15. A system according to claim 11, wherein the system further comprises an external part of said force-generating means which can be brought in operative connection with an internal part) of a force-generating means said valve for bringing and maintaining said valve member into said first position.

16. A system according to claim 12, wherein the system comprises means for weighing said container, said means for weighing being coupled to said control means.

17. A refillable container for storing fluids, wherein said container is provided with a valve, said valve comprising a housing with an inlet port and an outlet port wherein said inlet port is adapted for direct or indirect connection to a fluid source and wherein said outlet port is adapted for direct or indirect connection to said container;

a closing member for said outlet port;

and at least one valve member which in a first position allows fluid communication between said inlet port and said outlet port and which, in a second position, prevents fluid communication from said inlet port to said outlet port, wherein said valve member is brought into and maintained in said first position only if a static pressure difference across said valve member is below a predeterminable first threshold.

18. A container according to claim 17, wherein the valve is permanently connected to an opening of said container.

19. A method for filling a container having a valve with a fluid from a fluid source, said valve comprising a housing with an inlet port and an outlet port wherein said inlet port is adapted for direct or indirect connection to a fluid source and wherein said outlet port is adapted for direct or indirect connection to said container;

a closing member for said outlet port;

and at least one valve member which in a first position allows fluid communication between said inlet port and said outlet port and which, in a second position, prevents fluid communication from said inlet port to said outlet port, wherein said valve member is brought into and maintained in said first position only if a static pressure difference across said valve member is below a predeterminable first threshold;

the method comprising the steps of:
a) connecting the valve to said fluid source
b) controlling the delivery pressure of said fluid at said inlet port of said valve such as to maintain the static pressure difference across a valve member of said valve below a predetermined or predeterminable first threshold.

20. A method according to claim 19, wherein step b) comprises the sub-steps of
b1) initially providing a static delivery pressure to said inlet port of said valve that is less than a predetermined second threshold during a predetermined or predeterminable period of time
b2) after step b1, increasing said delivery pressure continuously or in a plurality of steps.

21. A method according to claim 19, wherein step b comprises the sub-steps of
b3) initially providing a delivery static pressure to said inlet port which is less than a second threshold value
b4) measuring the fluid flow rate of fluid flowing into said valve
b5) if said fluid flow rate is decreasing, then increasing the magnitude of said delivery static pressure in a predetermined or predeterminable manner
b6) continuing steps b4 and b5 until the measured fluid rate is zero.

22. A method according to claim 19, wherein step b) comprises the further sub steps of
b7) measuring the static pressure at said inlet port
b8) if said static pressure in said step is within a predetermined third threshold value of the magnitude of the pressure of the container when full, discontinuing filling of container and disconnecting the valve from said fluid source
b9) if said static pressure in step b7) is less than a predetermined third threshold value of the magnitude of the pressure of the container when full, discontinuing filling of container, releasing pressure in the valve upstream of the outlet port, resuming filling of container and continuing with steps b7) to b8).

23. A method according to claim 19, wherein before and/or during the filling procedure, the weight of the container is continuously measured.

* * * * *